Patented June 1, 1937

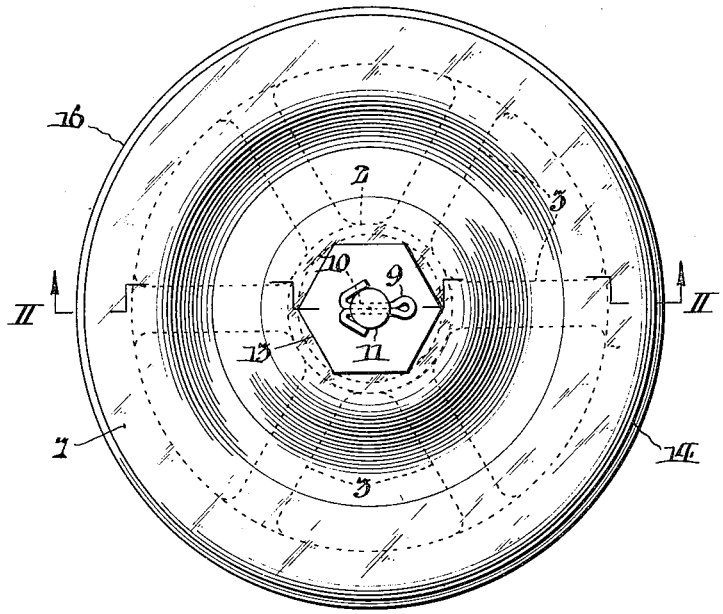
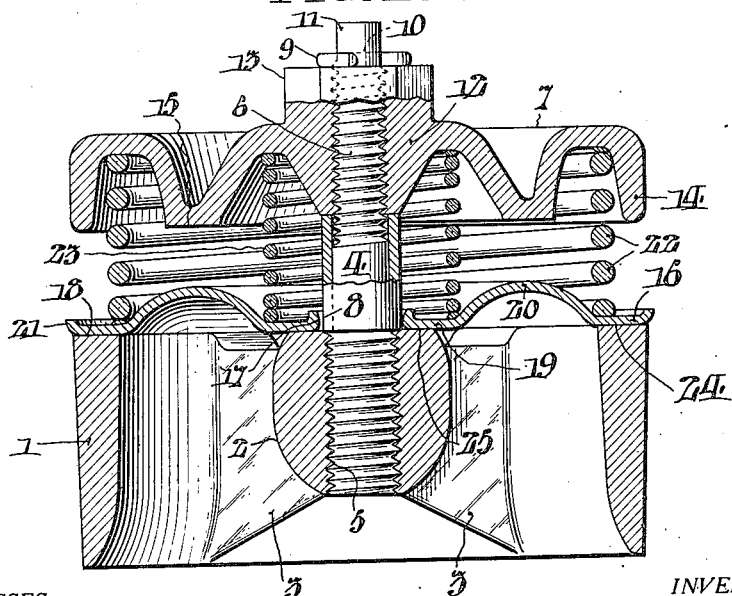

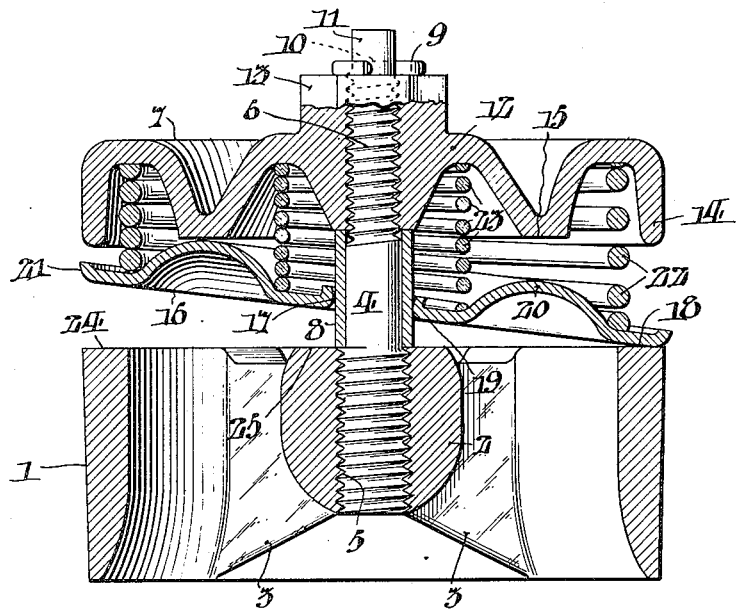
FIG. III.
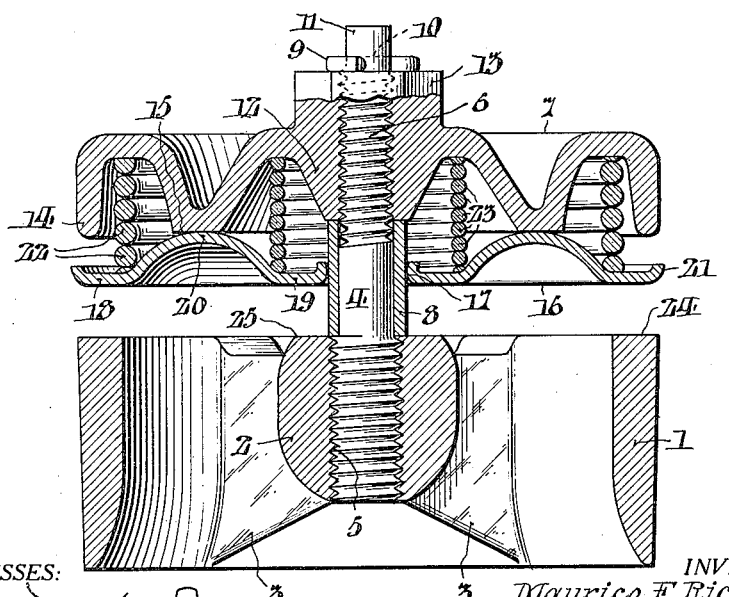
FIG. IV.

2,082,512

UNITED STATES PATENT OFFICE 2,082,512

VALVE

Maurice F. Richardson, Berwyn, Pa.

Application September 9, 1936, Serial No. 99,908

3 Claims. (Cl. 251—144)

This invention has reference generally to valves of the kind commonly classified as disc valves; while it relates more particularly, although not essentially, to valves primarily designed for heavy duty service. In other words, my present improvements relate to valves for use in pumps capable of operating on heavy-grade or semi-fluent liquids such as crude-oils, molasses, residuum and so forth.

Valves of the kind referred to as hitherto constructed usually include guide means for the disc element and stop means determining the limit of "lift" for said element. Such valves are subject to many disadvantages, pre-eminent among which is the tendency of the disc element to "cant" or tilt and "jamb" under the differential pressures set up between the valve and seat contacting areas relative to the non-contacting areas, as well as due to the inherently variable viscosity of the liquid being operated upon. Furthermore, this "canting" or "jambing" of the disc element rapidly results in its deformation with incidental injury to the seating areas.

The primary object of this invention is to provide a valve for the purpose stated which includes means effective to automatically restore the disc element when "canted" to proper balance in parallel relation with respect to the seat member and the stop means.

Another object is to prevent the valve disc from becoming "jambed" in an inclined position, whereby its distortion and injury to the seating area are obviated.

A further object is to furnish a valve, of the type above referred to, which embodies structural refinements that increase its efficiency and durability.

The recited objects, with others, and advantages of my invention will be apparent to those skilled in the art upon a reading of the subjoined description, and claims, in conjunction with the accompanying drawings; in which, Fig. I is a top plan view of a valve unit embodying the present improvements.

Fig. II is a vertical section taken as indicated by the staggered line II—II in Fig. I.

Fig. III is a view, similar to Fig. II, showing the valve disc in canted or inclined position; and, Fig. IV is a corresponding illustration showing the valve disc at maximum "lift" or in full open position.

Referring more in detail to the drawings, my improved valve comprises a ported seat member 1 embodying a central boss 2 and radial webs 3 defining flow passages therethrough. The seat member 1 is, exteriorly, slightly tapered downwards for forced-fit engagement in the usual partition or pump-chest deck, not shown, or elsewhere as desired.

The valve stem 4 is threaded at its lower part for a sufficient length, for jamb fitment into a correspondingly-threaded axial hole 5 in the valve seat member boss 2, while the upper portion thereof is similarly screw-threaded at 6 to receive a valve guard or stop means 7. This stop means 7 is locked against displacement by an interposed sleeve 8 and a split-cotter 9 passed through a diametric hole 10, in the reduced upper extremity 11 of the stem 4.

The stop means 7, it will be observed, is of somewhat dished formation and embodies a central boss 12 that is polygonally-shaped at 13, for application of an appropriate tool, whereby said stop means may be applied to, or removed from, the valve stem 4, as well as jambed down against the sleeve 8, in an obvious manner. In addition the stop means 7 is formed of undulate or somewhat corrugate cross-section to provide a surrounding skirt-portion 14 and an inner annular guard section 15, to limit the "lift" of the valve disc 16, slightly inset relative to the lower edge of said skirt portion, and also defining concentric annular recesses for a purpose later noted.

The valve disc 16 is conveniently, although not essentially, struck, or otherwise formed, from sheet metal to provide a central orifice having an outwardly rolled or half-round sectional surface 17, for free guidance over the sleeve 8 aforesaid, and for a purpose later on explained. The valve disc 16 is also shaped to provide outer and inner concentric seating surfaces 18, 19, respectively, with an intervening arched ridge 20, and a circumferential upwardly curved rim 21.

Interposed between the valve disc 16 and the stop means 7, in the concentric recesses of the latter, are outer and inner co-axial helical springs 22, 23 in compression and of different gauge and pressure. These helical springs 22, 23 are of diameters to exert their force against the valve disc seating surfaces 18, 19, respectively, at the regions where the arched ridge 20 merges into said surfaces, as will be clearly seen in Figs. II–IV. Particular attention is drawn, at this juncture, to the fact that the outer spring 22 is of a gauge, so that when completely collapsed, incident to "canting" or tilting of the valve disc 16, as shown in Fig. III, it effectively prevents actual metal to metal contact between the upper surface of the arched ridge 20 with the underside of the registering surface of the guard section 15; also, the gauge of the inner spring is such that when collapsed, as shown in Fig. IV, it effectively cushions the central portion of the valve disc 16 while permitting the upper surface of the arched ridge 20 to be arrested by the guard section 15 of the stop means 7. Furthermore, when both springs 22, 23, are expanded, as shown in Fig. II, it will be seen that the valve disc seating surfaces 18, 19, are effectively seated on the annular surfaces 24, 25 of the rim and hub portions of the ported seat member 1, in an obvious manner.

From the foregoing it will be readily understood that at the commencement of operation of a pump, fitted with valves of the type described and shown, or when it is moving slowly to start pumping a heavy liquid such as hereinbefore noted, the outside spring 22 permits the valve disc 16 to open like a clam-shell and, before striking the guard 15, it is stopped by the convolutions of said spring being brought into metal to metal contact. As the pump accumulates liquid, the clam-shell action of the valve disc 16 reduces, until said disc is opened evenly all around in opposition to the pressure of both springs 22, 23 whereupon it is arrested by the guard 15 instead of by contacting relation being set up between the convolutions of the outer spring 22. This clam-shell action is materially aided by provision of the rolled edge 17 around the orifice through a valve disc 16, while "jambing" of said disc against the sleeve 8 is eliminated, with resultant prevention of distortion of the inner seating surface 19 of the disc 16 and grooving of the outer seat surface 24 of the ported member 1.

From the foregoing the merits and advantages of my invention are deemed fully apparent to those skilled in the art, while it is obvious the inventive ideas set forth may be varied in minor details without departure from the scope of said invention as defined in the following claims.

Having thus described my invention, I claim:

1. A valve comprising a ported seat member with a central stem; stop means threaded on the stem upper portion and embodying annular recesses with an intervening guard section and a co-axial polygonal manipulator extension; a sleeve on the stem spacing the seat member and stop means; an axially apertured valve disc intermediate the seat member and stop means having its aperture rounded for free tilting coaction with the sleeve aforesaid; and concentric helical-springs of differential strength between the valve disc and stop means, one of which serves to prevent said disc when tilted from striking the guard section, and said springs jointly permitting the valve disc to move into contact with the guard section without metal to metal compression of their convolutions.

2. A valve comprising a ported seat member with a central stem; stop means threaded on the stem upper portion and embodying annular recesses with an intervening guard section and a co-axial polygonal manipulator extension; a sleeve on the stem spacing the seat member and stop means; an axially apertured valve disc intermediate the seat member and stop means having its aperture rounded for free tilting coaction with the sleeve aforesaid, said disc embodying outer and inner seating surfaces separated by an annular arched ridge and also having an upwardly curved circumferential rim; and outer and inner concentric helical-springs of differential strength between the stop means annular recesses and the valve disc seating surfaces where the latter merge with the arched ridge, one of said springs serving to prevent the valve disc when tilted from striking the guard section, and said springs jointly permitting the valve disc to lift into even contact with the guard section without jambing around the stem sleeve or distorting its inner seating surface.

3. The combination of claim 2 wherein the valve stem upper end is reduced and diametrically pierced for reception of a split cotter pin to lock the parts in assembled relation, and the outer helical-spring is of the greater strength.

MAURICE F. RICHARDSON.